Dec. 23, 1930. M. N. KORELIN 1,785,739
METHOD OF PEAT MINING
Filed July 28, 1928

MICHAIL N. KORELIN
INVENTOR
BY John P. Nixonow
ATTORNEY

Patented Dec. 23, 1930                                                   1,785,739

UNITED STATES PATENT OFFICE

MICHAIL N. KORELIN, OF MOSCOW, RUSSIA

METHOD OF PEAT MINING

Application filed July 28, 1928, Serial No. 296,080, and in Russia December 10, 1926.

My invention relates to methods of peat mining and has a particular reference to surface mining by means of cutting and disintegrating implements.

My method is especially applicable to such localities where peat with its overburden or top layer of soil is exposed at least part of the year and not fully covered with water, or where the water may be drained.

Peat, as a rule, contains a large percentage of moisture (reaching 80% or more), which must be considerably reduced before peat can be used as a fuel.

For this purpose peat is usually removed from the ground in the form of blocks cut by a suitable implement. These blocks are then left for air drying in piles on the field for several weeks until the moisture content is sufficiently reduced, so that the dried peat blocks can be removed and shipped to be used as fuel, often requiring additional drying in kilns or ovens.

This method is slow and expensive, requiring considerable handling of wet peat blocks before they are dried, also requiring a large tract of land where the peat blocks can be spread out for drying during a warm season.

According to my method the top layer of peat, instead of being cut in blocks, is crushed or disintegrated and left to be dried in such disintegrated condition. By properly handling such crushed peat according to my method, as hereinafter described, the drying may be considerably expedited and reduced to a few days. The handling and gathering of such crushed peat is greatly facilitated allowing the use of suitable conveying and transporting means.

My method is more fully described in the following specification and drawing in which—

Figure 1:
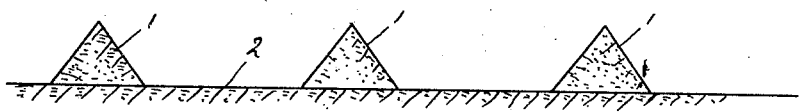
Figure 2:
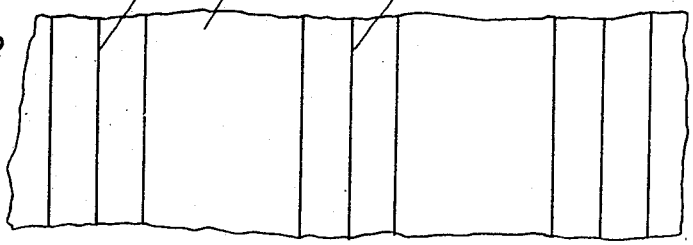
Figure 3:
Figure 4:

Fig. 1 is a sectional view of a peat field with partly gathered peat, Fig. 2 is a plan view of same, Fig. 3 is a view showing peat ridges partly removed and new ridges being built, and Fig. 4 shows the ridges completely rebuilt.

The peat field or bog must be drained by means of open canals or ditches. Then the top layer of dirt or overburden is removed by any suitable means, for instance, by a scraper, excavator or shovel, depending on its thickness or other conditions.

Tree stumps, large roots and stones must be removed.

Upon completion of the above described preparatory operations the upper layer of peat is worked with suitable crushing and disintegrating implements, such as disc plows or disc harrows, to a convenient depth. This depth may vary under different conditions, reaching, on the average, 100 centimeters.

In case when it is difficult to remove roots and stumps, the drum of the disintegrating implement may be also provided with disc saws for cutting roots into chips.

The implement must be adapted to crush peat into small lumps of the size of nut, pea and smaller.

The crushed peat is then piled in parallel sharp edged rows 1 with wide burrows 2 between them. This work may be done either by hand with shovels, or by means of suitable implements, such as snow plows etc.

The surface layer of the disintegrated peat quickly dries to a depth of a few centimeters, and then it is scraped off and piled in rows 3 (Fig. 3) in burrows left between the ridges.

The freshly exposed surface again quickly dries, and the scraping operation is repeated several times, until all of the peat is piled in new ridges 3 (Fig. 4) or in cone shaped piles where it may be subjected to further air drying. If necessary, the sides of the pile may be scraped off, as described for the first ridges, and the piles may be completely repiled or replaced, The finally dried peat is removed into storage places in baskets or by means of suitable conveyors.

Rain does not affect the drying of crushed peat to any considerable extent, as the moisture is absorbed only to a depth of a few millimeters, as I have found by actual experience.

Drying by my method takes very little time and, usually, a few days are sufficient for proper drying of piles of disintegrated peat. Any desired practical degree of dryness may be obtained, and usually it is about 30%.

After the upper layer of peat has been dried and removed, a second layer is scraped off and removed in a similar manner, and this operation may be repeated several times during the operating season.

During drying operations of the crushed peat the exposed surface of peat in the ground also dries to a considerable extent, so that less time is required for subsequent drying operations.

The crushed and dried peat can be easily and conveniently handled by means of suitable conveying and transporting appliances from the field to places where it is stored and treated for further use, also from the storage places to places of its ultimate consumption.

Air pipes may be used for gathering peat and conveying to storage places, using suction or pressure blowing. Grab buckets may be used for loading cars or trucks.

Crushed peat has certain advantages over peat blocks as it can be easily burned in furnaces with inclined grates. It slides down the grates by gravity and quickly dries in a stream of preheated air, especially if fed by thin layers. Belt or pneumatic conveyors may be used for filling bins above furnaces. Iron particles and stones may be separated by means of suitable magnetic and gravity separators.

Peat in a crushed form can be economically used for making briquettes, as it can be easily ground and dried in ordinary driers.

My method of mining and treating peat possesses the following advantages:

1. Peat is very economically and efficiently mined by means of suitable mechanical appliances.

2. No molding or shaping of peat is required, thereby considerable economy is effected.

3. Transportation of the wet peat is eliminated.

4. The time of drying is greatly reduced.

5. Dried peat can be easily removed from the fields by suitable mechanical means.

6. It can be conveniently transported to furances and burned efficiently.

7. It can be economically converted into briquettes.

8. My method of mining and treating peat is considerably cheaper than ordinary methods.

I claim as my invention:

1. The method of peat mining consisting in crushing and disintegrating the top layer of peat in the field, gathering the finely crushed material into sharp edged ridges with wide burrows, between said ridges, periodically removing thin dried layers from the inclined sides of said ridges, and building new ridges from said dried material in said burrows until said first ridges are completely removed.

2. The method of peat mining consisting in crushing and disintegrating the top layer of peat in the field, said crushing being applied to the surface in strips leaving untouched strips between said crushed strips, gathering the finely crushed material into sharp ridges with tapering sides on said untouched strips, periodically removing thin dried layers from said tapering sides of said ridges, and building new ridges from said dried material in said burrows until said first ridges are completely removed.

3. The method of peat mining, consisting in crushing and disintegrating the top layer of peat in the field, said crushing being applied to said surface in strips with approximately equal spaces between said crushed strips, gathering the finely crushed material into sharp ridges with tapering sides on said untouched spaces between said crushed strips, periodically removing thin dried layers from the sides of said ridges, building new ridges from said dried material in said strips until said first ridges are completely removed, then gradually removing the further dried layers from the sides of said second ridges and building third ridges from said dried material in said spaces between said strips.

Signed at the American Consulate at Riga, Latvia, this twenty fifth day of June A. D. 1928.

MICHAIL N. KORELIN.